US011938673B2

(12) United States Patent
Liu et al.

(10) Patent No.: US 11,938,673 B2
(45) Date of Patent: Mar. 26, 2024

(54) MATERIAL EXTRUSION 3-D PRINTING ON COMPATIBLE THERMOPLASTIC FILM

(71) Applicant: Arkema Inc., King of Prussia, PA (US)

(72) Inventors: David Shin-Ren Liu, Bala Cynwyd, PA (US); Camille Khadraoui, Caen (FR); Mark A. Aubart, West Chester, PA (US)

(73) Assignee: ARKEMA INC., King of Prussia, PA (US)

( * ) Notice: Subject to any disclaimer, the term of this patent is extended or adjusted under 35 U.S.C. 154(b) by 951 days.

(21) Appl. No.: 16/650,978

(22) PCT Filed: Sep. 28, 2018

(86) PCT No.: PCT/US2018/053348
§ 371 (c)(1),
(2) Date: Mar. 26, 2020

(87) PCT Pub. No.: WO2019/067857
PCT Pub. Date: Apr. 4, 2019

(65) Prior Publication Data
US 2020/0282635 A1 Sep. 10, 2020

Related U.S. Application Data

(60) Provisional application No. 62/565,500, filed on Sep. 29, 2017.

(51) Int. Cl.
B29C 64/106 (2017.01)
B29C 70/78 (2006.01)
B29C 64/393 (2017.01)
B33Y 10/00 (2015.01)
B33Y 50/02 (2015.01)
B33Y 70/10 (2020.01)

(52) U.S. Cl.
CPC ............. *B29C 64/106* (2017.08); *B29C 70/78* (2013.01); *B29C 64/393* (2017.08); *B33Y 10/00* (2014.12); *B33Y 50/02* (2014.12); *B33Y 70/10* (2020.01)

(58) Field of Classification Search
CPC ..... B29C 64/106; B29C 64/245; B29C 70/78; B29C 64/393; B29C 64/379; B33Y 70/10; B33Y 10/00; B33Y 50/02
See application file for complete search history.

(56) References Cited

U.S. PATENT DOCUMENTS

2015/0145168 A1* 5/2015 Rodgers ................ B29C 64/118
264/308
2017/0198134 A1 7/2017 Bertelo et al.
2018/0370125 A1 12/2018 Rolland et al.

FOREIGN PATENT DOCUMENTS

WO WO-2017112682 A1 * 6/2017 ........... B29C 64/129

OTHER PUBLICATIONS

Dai, CA et al. "Effect of the Monomer Ratio on the Strengthening of Polymer Phase Boundaries by Random Copolymers". Macromolecules, vol. 30, No. 22, Nov. 3, 1997, pp. 6727-6736.

* cited by examiner

*Primary Examiner* — Monica A Huson
*Assistant Examiner* — Kelsey C Grace
(74) *Attorney, Agent, or Firm* — BUCHANAN, INGERSOLL & ROONEY PC

(57) ABSTRACT

The invention relates to the use of a compatible thermoplastic material (film, sheet, or raft) as the base sheet or layer for 3-D printing an article. The use of the base film provides a means of printing a large article, and of reducing warpage by printing directly on the film. The printed article adheres to the film better than to traditional printer surfaces (glass, metal, glue, or reusable films), because the printed article and film weld together by forming chain entanglements, due to being compatible, miscible, or semi-miscible in the melt.

10 Claims, No Drawings

MATERIAL EXTRUSION 3-D PRINTING ON COMPATIBLE THERMOPLASTIC FILM

This application claims benefit, under U.S.C. § 119 or § 365 of PCT Application Number PCT/US2018/053348, filed Sep. 28, 2018; and U.S. Provisional Application No. 62/565,500, filed Sep. 29, 2017; said applications incorporated herein by reference.

FIELD OF THE INVENTION

The invention relates to the use of a compatible thermoplastic material (film, sheet, or 3d-printed material) as the base sheet, film or layer for 3-D printing an article. The use of the base film provides a means of printing larger articles, and of reducing warpage by printing directly on the film. The printed article adheres to the film better than to traditional printer surfaces (glass, metal, glue, or reusable films) because the printed article and film weld together by forming chain entanglements, due to being compatible, miscible, or semi-miscible in the melt.

BACKGROUND OF THE INVENTION

Adhesion needs to be strong between a 3D printed part (material extrusion additive manufacturing) and the build plate of the printer for a part to be printed. Since the position of the nozzle when extruding the material is determined by the software prior to printing, if the printed part moves or warps during printing, then the subsequent layers will not be printed correctly, resulting in a poorly formed article.

Generally, in 3-D printing, the article is printed directly onto glass or metal. Tapes and glue sticks can be used to increase adhesion, but this provides only a small adhesion improvement. In situations where the adhesion to glass or metal is not enough, surfaces may be additionally modified by placing adhesion promoting films, such as polyetherimide (PEI), on the build plate and printing on top of those films. Those films increase the adhesion of the print material to the build plate but release the article after printed—the films are meant to be reused. There is no permanent bond formed between the print material and the adhesion promoting films.

One problem in 3D printing, is that certain materials that would otherwise have excellent mechanical, chemical or temperature stability properties tend to shrink or warp and have poor adhesion to the glass or metal base material, or PEI or other typical films.

Surprisingly, the compatible, miscible films of the invention provide excellent adhesion to the printed part. The film is discarded, or becomes a permanent part of the article. While not being bound by any particular theory, it is believed that the film and article polymers being miscible, compatible or semi-miscible in the melt, form chain entanglements, leading to welding of the two polymer, which will prevent the article from pulling away from the base—leading to excellent adhesion, and a reduced warpage. This is especially important for crystalline and semi-crystalline polymers, which tend to show a higher warpage from being 3D-printed than amorphous polymer article.

SUMMARY OF THE INVENTION

The invention relates to a 3D printed crystalline or semi-crystalline article welded to a polymer film where the polymer film has a glass transition temperature (Tg) less than 50° C., preferably less than 80° C., more preferably less than 100° C. under the printing temperature.

Alternatively, the polymer film adhered to said article, has a Tg or melting temperature (Tm) at least 10° C., preferably at least 20° C., preferably at least 30° C., and even more than 50° C. less than the Tg or Tm of the thermoplastic of the article.

The invention further relates to a process for forming a 3D printed article, comprising the step of placing a polymer sheet between the glass build plate and the article to be printed, wherein said polymer film is compatible, miscible or semi-miscible with said article in the melt state.

Within this specification embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

Aspects of the invention include:
1. An article made by 3D printing, wherein said article comprises:
    a) a crystalline or semi-crystalline polymer article,
    b) a polymer film adhered to said article, between the article and the base plate of the 3-D printer; wherein said film has a Tg less than 50° C., preferably less than 80° C., more preferably less than 100° C. under the printing temperature.
2. The article of aspect 1, wherein said crystalline or semi-crystalline polymer is selected from the group consisting of polyvinylidene fluoride homopolymer and copolymers, polyamides, polypropylene, polyarylether ketones, polyether ether ketone, polyether ketoneketone
3. The article of either aspects 1 or 2, wherein said crystalline or semi-crystalline article is a homopolymer or copolymer of polyvinylidene fluoride, and said film is selected from the group consisting of poly(meth)acrylate homopolymer or copolymers, polycaprolactone, and polylactic acid films.
4. The article of any of aspects 1 to 3, wherein said crystalline or semi-crystalline polymer article is a polyamide, and said film is selected from the group consisting of amorphous polyamides or copolyamides, low melting block polyether-amides, and polyamide grafted polyolefin.
5. The article of any of aspects 1 to 4, wherein said crystalline or semi-crystalline polymer article is a polypropylene, and said film is selected form the group consisting of polyethylene, and anhydride grafted polyolefin.
6. The article of any of aspects 1 to 45 wherein said crystalline or semi-crystalline polymer article is semicrystalline polyether ketoneketone (PEKK) or polyether etherketone (PEEK), and the film is selected from the group consisting of an amorphous PEEK, amorphous PEKK and polyetherimide
7. An article made by 3D printing, wherein said article comprises:
    a) a crystalline or semi-crystalline polymer article,
    b) a polymer film adhered to said article, between the article and the glass base plate of the 3-D printer; wherein said film has a Tg or Tm at least 10° C., preferably at lease 20° C., preferably at least 30° C., and even more than 50° C. less than the Tg or Tm of the thermoplastic of the article.

8. A process for forming a 3D printed article, comprising the steps of
   a) placing a polymer film or sheet between the glass build plate and the article to be printed, wherein said polymer film in compatible, miscible or semi-miscible with said article in the melt state. wherein said film or sheet has a Tg less than 50° C., preferably less than 80° C., more preferably less than 100° C. under the printing temperature;
   b) increasing or decreasing the temperature of the build plate as needed, once the film is applied;
   c) 3D printing an article on the polymer film or sheet.
9. The process of aspect 8, wherein the polymer film and the 3D printed polymer article are welded—having entangled polymer chains at the interface.

DETAILED DESCRIPTION OF THE INVENTION

Film

The film of the invention is either compatible, miscible or semi-miscible with the polymer filament used to form the printed article. By miscible, semi-miscible, and compatible, it is meant that the polymer should be capable of being blended in a ratio such that a single intimate mixture is generated without separation into distinct bulk phases.

The 3D printed article adheres to the film better than to traditional printer surfaces or base plates (glass, metal, glue, and other films) because it forms chain entanglements with the polymer of the film, providing the best possible adhesion. The film is selected for its compatibility/miscibility with the polymer of the article, its Tg, and modulus, and is easily applied and disposed of after each print. The film is adhered so well to the article, that it is not reused. The properties of the film determine the adhesion and reduction in warpage provided in each case.

The choice of film depends on the choice of polymer(s) used in the 3D material extrusion additive manufacturing process. The film is selected for compatibility, miscibility, or semi-miscibility in the melt state. Preferably the film is produced from an amorphous or low crystallinity material, with a Tg less than 50° C., preferably less than 80° C., more preferably less than 100° C. under the printing temperature. For example, if the printing temperature is 260° C., the Tg of the film is less than 210° C., preferably less than 180° C., and most preferably less than 130° C. Alternatively if the film is selected from a semi-crystalline material, the film has a Tm of less than 50° C., and preferably less than 80° C. under the printing temperature.

In a different embodiment, the polymer of the 3D printed article compared to the polymer film can be such that the Tg or Tm of the film is at least 10° C., preferably at least 20° C., preferably at least 30° C., and even more than 50° C. less than the Tg or Tm of the thermoplastic of the article. "Tg" is used for amorphous polymers and "Tm" used for crystalline or semi-crystalline polymers.

The term "film" includes sheets, rafts and films, including thickness of from 30 micrometers to 10 cm, and preferably from 1 to 5 cm. A thick film provides increased protection against warping.

Examples of films useful in the present invention include, but are not limited to: polycaprolactone, polylactic acid, (meth)acrylates, polyamides, polyimides, amorphous polyamides, functional polyolefins grafted with polyamide segments, and polyolefins doped with maleic anhydride grafted polyolefin.

In one embodiment, an acrylic film is used in combination with a polyvinylidene fluoride (PVDF) article. Acrylic films adhere well to the heated glass plate when near the acrylic film Tg. Acrylic copolymers can be used having Tgs of greater than or less than that of polymethyl methacrylate. Lower Tg films melt faster, providing earlier welding and better adhesion, however lower Tg acrylates lose advantages of warpage reduction. PVDF homopolymers and copolymers are known to be melt miscible with acrylics. When PVDF layers are printed at 260° C. onto a heated acrylic film, the hot interface effectively welds the PVDF to the acrylic film, allowing for entanglements between the PVDF and acrylic polymer chains—resulting in high adhesion between the film and article. The use of acrylic film will not prevent internal stress, shrinkage and warpage, but will limit separation from the build plate. The acrylic film essentially acts as a large raft under the forming 3D part. Raft and brim base materials are 3D-printed directly onto the glass base, essentially providing an in-situ thick film layer upon which the article can be printed. These are generally made of the same materials as the article to be printed. Raft and brim processes are anticipated as a means of practicing the current invention, in the case where the printed base is of a different material than the article, or when a raft or brim process of the same material as the article is used on top of the film of the invention. An advantage of a simple film over a raft or brim process is that it requires almost no added time into the process.

In one embodiment, the film of the invention contains areas or phases that are not miscible, compatible or semi-compatible with the polymer of the 3D printed polymer article. Such a mixed film would provide the needed adhesion to the 3D printed article, with the non-miscible, non-compatible or non-semi compatible areas providing a means for removal of the film from the printed article. Such a film having both compatible and non-compatible areas can be produced, for example, by co-extrusion using many dies—and alternating the miscible, compatible or semi-compatible polymer with the polymer that is not miscible, compatible or semi-compatible—resulting in stripes of each polymer in one film. Another example means of producing a film having both compatible and non-compatible areas could be by a melt process of a blend of the incompatible components, followed by a slow cooling that would allow thermodynamic separation of the phases.

Articles (Polymer Filaments)

The problem of poor adhesion—including warping due to poor adhesion to the glass build plate—is a particular issue in articles formed from crystalline and semi-crystalline polymer filament—including, for example, but not limited to: polyvinylidene fluoride, polyamides, polyether ketone, polyether ether ketone and polypropylene. Other high warping materials include ABS and other styrene block copolymers. The significant warping and poor base plate adhesion of these materials have limited the size of articles made from these materials by a 3D printing method.

Specific pairings of semi-crystalline or crystalline articles with films of the invention include, but are not limited to:
  Polyvinylidene fluoride article on poly(meth)acrylate homopolymer or co-polymer film.
  Polyvinylidene fluoride article on a polycaprolactone film.
  Polyvinylidene fluoride article of a polylactic acid film.
  Polyamide article, such as PA 11 and PA12, on an amorphous polyamide or copolyamide (such as RILSAN® Clear resin from Arkema Inc.)

Polyamide article on a low melting block polyether-amide (such as PEBAX® resin from Arkema Inc.)
Polyamide article on a polyamide grafted polyolefin (such as APOLHYA® from Arkema Inc)
Polypropylene on a polyethylene.
Polypropylene on an anhydride grafted polyolefin.
Semicrystalline polyether ketoneketone (PEKK) or polyether etherketone (PEEK) article on an amorphous polyether ketoneketone or polyether etherketone. Such as PEKK 7000 series resin from Arkema Inc, as the article on an amorphous-behaving PEKK 600 series resin from Arkema Inc. The PEKK 6000 resin has a Tg of about 160° C., with the printing temperature of the PEKK 7000 article being around 350° C.
PEKK or PEEK article with PEI film (polyether imide with a Tg about 210° C.).

The crystalline or semi-crystalline polymer composition could optionally further comprise other miscible, compatible or semi-compatible polymers at less than 50 weight percent, preferably less than 40 weight percent, more preferably less than 30 weight percent and even less than 20 or less than 10 weight percent; and/or filler materials at less than 50 weight percent, preferably less than 40 weight percent, more preferably less than 30 weight percent and even less than 20 or less than 10 weight percent; the weight percent based on the total weight of the crystalline or semi-crystalline polymers.

In one embodiment, at least 50 weight percent, more preferably at least 60 weight percent, and more preferably at least 70 weight percent of PVDF homopolymer or co-polymer with a polymethlmethacrylate (PMMA) homopolymer or copolymer. The PMMA copolymer of the alloy contains at least 50 weight percent, and more preferably at least 75 weight percent of methylmethacrylate monomers units. The melt miscible blend of PVDF with PMMA provides a surprising number of benefits including to reduce and control warpage, improve optical transparency when this is desirable, reduce shrinkage, improve base adhesion, improve layer to layer adhesion, and improve z direction mechanical properties. In addition the overall print quality is surprisingly improved. Low and very low viscosity compatible or miscible non-fluoropolymers can also be used for improved printability.

A useful compatible non-fluoropolymer could be a block copolymer containing at least one miscible block. The immiscible block could confer other properties like enhanced impact, ductility, optical properties, and adhesive properties. Either block could contain functional groups. In one embodiment, poly(meth)acrylate homo- and co-polymer blocks could be used as the compatible block in the block co-polymer.

Blends of the fluoropolymer with other fluoropolymers or non fluoropolymers can be accomplished by any practical means including physical blending of the different polymers as dry ingredients, in latex form, or in the melt. In one embodiment, filaments of two or more polymers are coextruded in a core-sheath, islands in the sea, or other physical structure.

In one embodiment the filler is selected from the group consisting of carbon fiber, milled carbon fiber, carbon powder, carbon nanotubes, glass beads, glass fibers, nano-silica, Aramid fiber, polyaryl ether ketone particles or fibers, $BaSO_4$, talc, $CaCO_3$, graphene, nano-fibers, impact modifiers, and hollow spheres, and mixtures thereof.

Process

The film of the invention, of the desired composition, Tg, modulus, thickness and other factors, is cut to the desired size and is placed (with or without glue) on a heated build plate, pushing it tight against the build plate uniformly light pressure, and the chosen filament(s) are printed on to the film. Once cooled, the film can then be removed from the article, and is typically sacrificed.

A typical process for using an acrylic film would be the following:
Heat the glass build plate to a range of 85 C-95 C, (Tg of the film).
Wear protective gloves.
Put the acrylic film onto the heated glass build plate.
Use a fabric or paper towel to push uniformly the film in a crisscross direction against the glass.
Rub to remove air bubbles.

The temperature of the build plate may be adjusted close to the Tg of the acrylic film, but in any case it needs to be close or slightly higher.
Once the film is applied, the temperature of the heated glass build plate may be increased or decreased as needed. Range→60° C.-120° C.;
3D printing an article onto the acrylic film;
Remove from the build plate after printing is completed. Cut the excess of film out from the 3D printed part. The acrylic film in contact with the part cannot be delaminated Alternatively, the acrylic film (generally 50-350 micrometers can be increased to a sheet thickness of greater than 350 micrometers to counter internal stresses during cooling, which could cause the PVDF printed article to come off the build plate. In this case, a double sided pressure sensitive adhesive tape can be used between the acrylic sheet and the glass build plate. At this point, the build plate does not affect the sheet temp (since the sheet is thick), so heating up the build plate doesn't make any difference so the printing is onto a print bed that is essentially at room temperature.

An alternative to above, as mentioned is that you can print the compatible film instead, using a printer with two or more nozzles. The compatible, less warping material can be printed first, as the first layer or RAFT layer, and then the desired material printed on top.

EXAMPLES

Example 1

3D printed articles were formed, using the process described above on the following materials shown in Table 1. The Table includes an approximate maximum size of a 3D printed PVDF homopolymer part capable under different build plate/base adhesion conditions.

TABLE 1

| Build Plate Condition | Roughly estimated diameter size range of the printed part (in mm) | With BRIM or RAFT (in mm) |
|---|---|---|
| Non Heated glass build plate (Comp) | 0 | 0 |
| Heated glass build plate (Comp) | 5 | 5 |
| Heated + PVA Glue Coating (Comp) | 20 | 40 |
| Heated + Acrylic Film (70 microns) (invention) | 80 | 100 |
| Heated + Acrylic Film (70 microns) + Tape (invention) | 100 | N/A |
| Heated + acrylic sheet + Tape (invention) | 150 | N/A |

Example 2

Using the process described above, the following material films were used: 3D printed article is polyamide 11.
Base materials:
- BRIM→parts come off, except for very small ones.
- RAFT—parts come off
- Glue coating, can hold if a huge amount of glue used, only for small parts (<5 cm)
- Acrylic film—no chemical interaction, worse than no film.
- PEI film—adhesion OK for small parts (<5 cm)
- Arkema amorphous polyamide film (70 microns)—stronger adhesion than to PEI and glue.

What is claimed is:

1. A polymer composite article comprising:
    a) a polymer article made by a 3D printing process comprising a crystalline or semi-crystalline polymer,
    b) a polymer film having a thickness ranging from 30 μm to 10 cm adhered to said polymer article, between the article and a base plate of a 3-D printer; wherein said film is miscible, compatible, or semi-compatible with said article, wherein said film has a Tg lower than 50° C. below the printing temperature.

2. The polymer composite article of claim 1, wherein said crystalline or semi-crystalline polymer is selected from the group consisting of polyvinylidene fluoride homopolymer and copolymers, polyamides, polypropylene, polyether ether ketone, polyether ketoneketone.

3. The polymer article of claim 1, wherein said article comprising said crystalline or semi-crystalline polymer further comprises up to 50 percent by weight of a miscible, compatible or semi-compatible polymer.

4. The polymer article of claim 1, wherein said article comprising said crystalline or semi-crystalline polymer further comprises up to 50 percent by weight of one or more fillers.

5. The polymer article of claim 2, wherein said crystalline or semi-crystalline polymer is a homopolymer or copolymer of polyvinylidene fluoride, and said film is selected from the group consisting of poly(meth)acrylate homopolymer or copolymers, polycaprolactone, and polylactic acid films.

6. The polymer article of claim 2, wherein said crystalline or semi-crystalline polymer is a polyamide, and said film is selected form the group consisting of amorphous polyamides or copolyamides, low melting block polyetheramides, and polyamide grafted polyolefin.

7. The polymer article of claim 2, wherein said crystalline or semi-crystalline polymer is a polypropylene, and said film is selected form the group consisting of polyethylene, and anhydride grafted polyolefin.

8. The polymer article of claim 2, wherein said crystalline or semi-crystalline polymer is semicrystalline polyether ketoneketone (PEKK) or polyether etherketone (PEEK), and the film is selected from the group consisting of an amorphous PEEK, amorphous PEKK and polyethelimide.

9. The polymer article of claim 1, wherein said film comprises up to 40 weight percent of polymer phases that are not miscible, compatible or semi-compatible with said 3D printed polymer article.

10. An article made by 3D printing, wherein said article comprises:
    a) a crystalline or semi-crystalline article,
    b) a polymer film having a thickness ranging from 30 μm to 10 cm adhered to said article, between the article and the glass base plate of the 3-D printer; wherein said film has a Tg or Tm at least 10° C. less than the Tg or Tm of the thermoplastic of the article.

* * * * *